2,967,691
FLOWER POT HOLDER

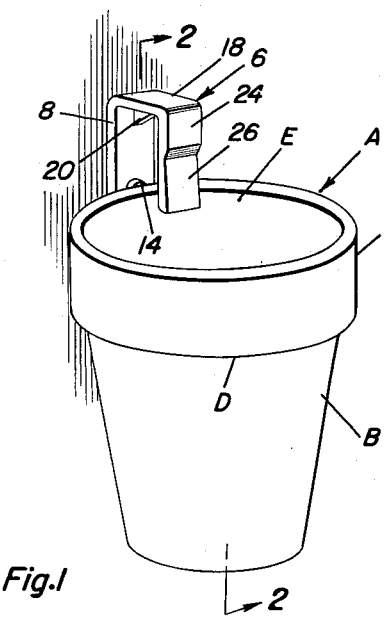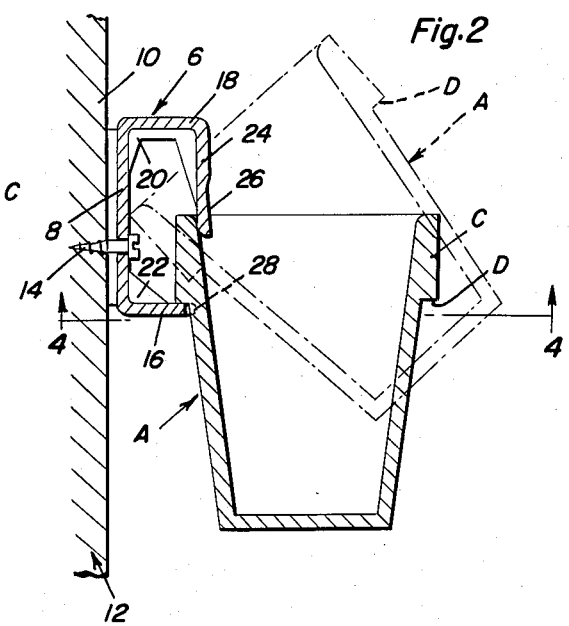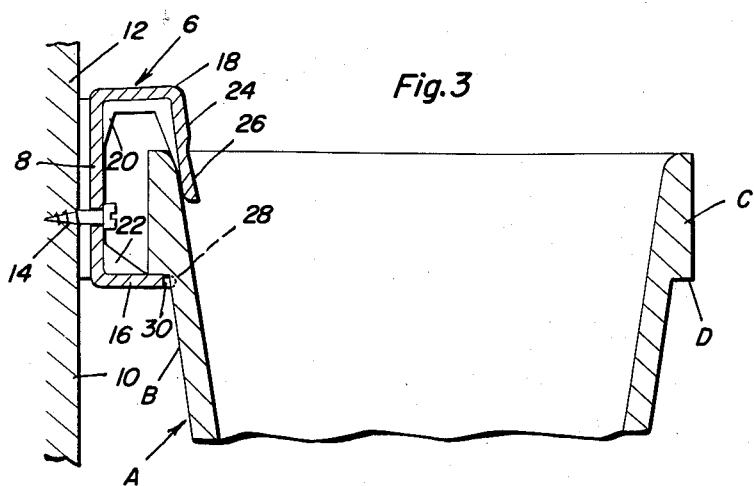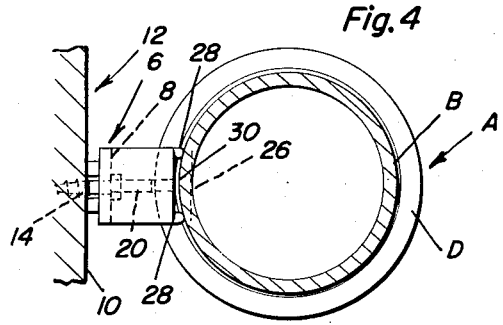
Ernst O. Lehnbeuter
William L. Warmington
INVENTORS

Ernst O. Lehnbeuter, 645 NE. 34th St., Oakland Park, Fla., and William L. Warmington, 271 Hibiscus Ave., Lauderdale-by-the-Sea, Fla.

Filed May 19, 1958, Ser. No. 736,382

1 Claim. (Cl. 248—311)

The present invention relates to an improved holder for plant and flower containers, particularly so-called flower pots of the type having a rim-like collar around the top and wherein the endless bottom edge thereof provides a shoulder. More specifically, the invention pertains to a novel fixture or bracket the component parts of which are such that a simple clamping and retaining finger extends into the receptacle portion of the pot and a supporting arm engages beneath the shoulder.

An object of the invention is to provide a simple, practical and an efficient fixture or bracket which may be formed from a simple single plastic, metal or similar strap, said strap being bent or otherwise formed upon itself to define a substantially U-shaped main bracket portion and one end of which is fashioned into a slightly resilient pot engaging and retaining finger.

In carrying out the invention a bracket having the construction above referred to lends itself as a practical supporting fixture for flower pots having receptacle portions of varying sizes and diameters and which, in proportion, have either narrower or deeper collars defining the aforementioned shoulder.

It is also an object of the invention to provide a simple, practical and economical pot holding bracket or fixture which is such that it may be simply and readily attached to and supported on a wall or other support surface, tree, post, fence or the like and which is such in construction that it will meet expected needs of users and will comply with manufacturing requirements and economies of manufacturers.

Another object of the invention is to provide a bracket-type holder which will effectually assist in the presentation or display of potted plants and flowers and which itself is such in form and design that it does not detract from the attractiveness of the flower in the pot.

Then, too, novelty is predicated on a bracket or fixture which lends itself to installation indoors or outdoors with little likelihood that it will rust or become otherwise unsightly. In addition, it is such that it will firmly hold the flower pot or receptacle without tilting or swaying or allowing it to fall accidentally.

Other objects, features and advantages will become more readily apparent from the following description and the accompanying drawing.

In the drawing, wherein like numerals are employed to designate like parts throughout the views:

Fig. 1 is a perspective view of an empty flower pot showing how it is hung and supported and showing the holding bracket therefor;

Fig. 2 is a section on the irregular vertical line 2—2 of Fig. 1, looking in the direction of the arrows and also showing the full and dotted line representations of the flower pot and suggesting how it may be either applied or removed or hung as the case may be;

Fig. 3 is a view of a fragmentary nature and which shows substantially that which is illustrated in Fig. 2 except that the collar or rim of a larger flower pot is shown; and Fig. 4 is a section on the horizontal line 4—4 of Fig. 2 looking in the direction of the arrows.

Referring now to the drawing and particularly to Fig. 1 the conventional flower pot is denoted at A. The improved holder, which as before stated takes the form of either a bracket or a fixture, is denoted by the numeral 6. The receptacle portion of the flower pot is tapered at B and the aforementioned endless rim or collar is denoted at C and the shoulder at D. It is the shoulder D and the interior surface E of the receptacle portion which are of prominence in the presentation here and this is brought out in Figs. 2 and 3. With reference to these two figures in conjunction, of course, with the other figures, it will be noted that the main or body portion of the bracket may be said to be of U-shaped form. The bracket, incidentally, may be formed from strap metal, plastics or suitable material. Perhaps certain grades of plastic will be utilized. In any event the elongated flat bight portion or bar 8 lends itself to application against the flat surface 10 of the wall or other support means 12. It is provided with a hole to accommodate a suitable fastening screw or the like 14. The lower right angularly disposed outstanding arm or rim is denoted at 16 and the upper one by the numeral 18. The triangular reinforcing webs are denoted at 20 and 22 respectively and they assist in integrating the arms 16 and 18 with the bight portion 8. The outer end of the arm 18 is provided with a depending retaining and clamping finger the upper portion of which is denoted by the numeral 24. The lower portion is thinned, as it were, as at 26 to provide a resilient finger to engage the surface E of the pot. Actually one may consider the arm 18 and clamping finger or retainer as providing a sort of a hook to take over the upper edge of the pot and to releasably engage the same as shown. The lower arm is brought out in Fig. 4 and it will be noted that the free or terminal end portion thereof is provided with a pair of spaced lugs 28 defining an intervening gap or recess 30 and providing a construction which lends itself to engaging conformably and reliably the convex surface of the wall of the pot. This particular arm provides a hanger which engages underneath the shoulder D and provides a satisfactory hanger. By hanging the shouldered collar on the arm 16 and hooking the clamping and retaining finger over the edge of the pot the pot is not only suspended or hung but is clamped in a position against accidental displacement. Also, the free end of the finger 26 is spaced from the lugs 28 a distance to allow the collar of the pot to be canted or tilted and slipped either in or out as brought out satisfactorily in Fig. 2. It will be further noted that the vertical plane in which the clamping finger depends is properly related to the free edge features 28 and 30 that the finger may be said to depend in a plane beyond the free end of the arm 16.

It will be evident from the disclosure that the invention has to do with a simple, inexpensive holder for flower pots, plant containers and similar containers and which is therefore such in construction that it will fit containers of varying sizes having shoulder forming collars of the differing sizes evident by comparing the smaller pot of Fig. 2 with the larger pot of Fig. 3. That is to say, the same size bracket or fixture will accommodate pots of various sizes within, of course, a limited range of interpretation. This holder will position and hold a flower pot in a natural horizontal plane. It can be easily installed on almost any surface and is an unobtrusive adaptation insofar as the design or appearance is concerned. That is to say, its use will not detract from the expected normal or natural beauty of the potted plants or flowers and yet will rigidly support a pot and will obviate the danger of the pot tilting, swaying or becoming disengaged and falling. Then, too, with this type of a bracket or fixture a flower pot can be easily applied or removed or changed from one bracket to another.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A holder for a conventional circular flower pot of the type including a horizontal, circumferentially extending shoulder on its upper portion, said holder comprising: a bracket including a flat, vertical apertured bar for mounting on a wall, a flat, horizontal arm of a material width on the lower end of said bar and engageable beneath the shoulder for supporting the pot, a horizontal arm on the upper end of the bar projecting forwardly beyond the first-named arm and terminating in a depending finger of a material width spaced above the horizontal plane of first-named arm and engageable in the upper portion of the pot for retaining same on said first-named arm, and spaced lugs on the free end of said first-named arm engageable with the periphery of the pot at circumferentially spaced points immediately beneath the shoulder for stabilizing said pot on the holder.

References Cited in the file of this patent

UNITED STATES PATENTS

| | | |
|---|---|---|
| 2,006,083 | Dixon | June 25, 1935 |
| 2,504,583 | Rachic | Apr. 18, 1950 |
| 2,711,873 | Larin | June 28, 1955 |
| 2,823,004 | Melloh | Feb. 11, 1958 |

FOREIGN PATENTS

| | | |
|---|---|---|
| 854,078 | Germany | Oct. 30, 1952 |